United States Patent [19]

Cullen

[11] Patent Number: 5,398,736
[45] Date of Patent: Mar. 21, 1995

[54] AGRICULTURAL FEED BAGGING MACHINE HAVING A TUNNEL GRADER EDGE

[75] Inventor: Steven R. Cullen, Astoria, Oreg.

[73] Assignee: Versa Corporation, Astoria, Oreg.

[21] Appl. No.: 200,764

[22] Filed: Feb. 23, 1994

[51] Int. Cl.⁶ ............................................. B65B 1/06
[52] U.S. Cl. ................................... 141/114; 100/65; 100/144; 141/71; 141/231; 141/10; 53/459
[58] Field of Search .................. 141/114, 71, 313, 10, 141/231; 100/144, 65, 100, 177; 53/255, 258, 459, 469, 473, 567, 576, 570

[56] References Cited

U.S. PATENT DOCUMENTS

| | | | |
|---|---|---|---|
| 3,687,061 | 8/1972 | Eggenmuller et al. | 100/65 |
| 3,760,556 | 9/1973 | Morris | 141/71 X |
| 3,791,593 | 2/1974 | Griffin | 239/667 |
| 4,046,068 | 9/1977 | Eggenmuller et al. | 100/65 |
| 4,308,901 | 1/1982 | Lee | 141/114 |
| 4,310,036 | 1/1982 | Rasmussen et al. | 141/114 |
| 4,337,805 | 7/1982 | Johnson et al. | 141/71 |
| 4,502,378 | 3/1985 | Cullen | 100/65 |
| 4,621,666 | 11/1986 | Ryan | 141/114 |
| 4,653,553 | 3/1987 | Cox et al. | 141/114 |
| 4,688,480 | 8/1987 | Ryan | 100/144 |
| 4,724,876 | 2/1988 | Ryan | 141/114 |
| 4,945,715 | 8/1990 | Brodrecht | 53/567 |
| 4,949,633 | 8/1990 | Johnson et al. | 100/65 |
| 5,140,802 | 8/1992 | Inman et al. | 53/459 |
| 5,159,877 | 11/1992 | Inman et al. | 100/144 |
| 5,213,147 | 5/1993 | Policky et al. | 141/71 |
| 5,269,829 | 12/1993 | Meyer | 71/9 |
| 5,295,554 | 3/1994 | Cullen | 180/236 |

Primary Examiner—Ernest G. Cusick
Attorney, Agent, or Firm—Zarley, McKee, Thomte Voorhees & Sease

[57] ABSTRACT

An agricultural feed bagging machine for bagging agricultural material into agricultural bags including a rearwardly extending tunnel having a rearward edge. A grader edge is mounted on the rearward end of the tunnel and protrudes into the tunnel for engagement with the material sliding along the inside surfaces of the tunnel so that the filled agricultural bag will have a substantially smooth outer surface.

4 Claims, 2 Drawing Sheets

AGRICULTURAL FEED BAGGING MACHINE HAVING A TUNNEL GRADER EDGE

BACKGROUND OF THE INVENTION

1. Field of the Invention

This invention relates to an agricultural feed bagging machine and more particularly to an agricultural feed bagging machine having a grader edge located at the rearward end of the tunnel so that a smooth filled bag is achieved.

2. Background Information

Agricultural feed bagging machines have been employed for several years to bag or pack silage or the like into elongated plastic bags. Two of the earliest bagging machines are disclosed in U.S. Pat. Nos. 3,687,061 and 4,046,068. In most prior art bagging machines, silage or the like is supplied to the forward or intake end of the bagging machine and is fed to a rotor which conveys the silage into a tunnel on which the bag is positioned so that the bag is filled. In most prior art bagging machines, the rotor is located at the lower end of a hopper.

All bagging machines over the past several years have had one undesirable trait in common. Legume feedstuffs (e.g., alfalfa, clover and grasses), especially when they are cut longer than four inches and are relatively dry, produce a very lumpy bag. A lumpy bag results in several disadvantages. Due to the lumpy bag, there is less material in the bag since there is a poor utilization of space. Further, a lumpy bag results in excessive air being left in the bag which interferes with fermentation activity within the bag thereby resulting in a less than desirable quality of feed. Further, lumps or bulges in the filled bags greatly increase the chances of having the bag fail or rupture due to bulge point pressure.

SUMMARY OF THE INVENTION

An improved agricultural bagging machine is disclosed which includes a rearwardly extending tunnel having a substantially round grader section positioned at the rearward end thereof. The round grader section is designed so that approximately one-half of the round section is located inside the tunnel and approximately one-half of the round section is located outside the tunnel. As the feedstuff slides along the inside surface of the tunnel, the feedstuff contacts the grader edge at the rear end of the tunnel. The grader edge creates a certain amount of drag on the feed thereby holding back just enough of the feed to allow the feed to fill in the hollow void sections normally found in the legume silages. The result is a smooth bag without lumps or bulges.

It is therefore a principal object of the invention to provide an improved agricultural feed bagging machine.

A further object of the invention is to provide an improved agricultural feed bagging machine including a tunnel grader edge at the rearward end of the tunnel to create smooth bags.

Still another object of the invention is to provide a tunnel grader edge at the rearward end of the tunnel which creates drag on the feed to hold back sufficient feed to allow the feed to fill in the hollow void sections normally found in bags containing legume silages.

Yet another object of the invention is to provide an agricultural feed bagging machine which is economical of manufacture, durable in use and refined in appearance.

These and other objects will be apparent to those skilled in the art.

DESCRIPTION OF THE PREFERRED EMBODIMENT

Figure 1:
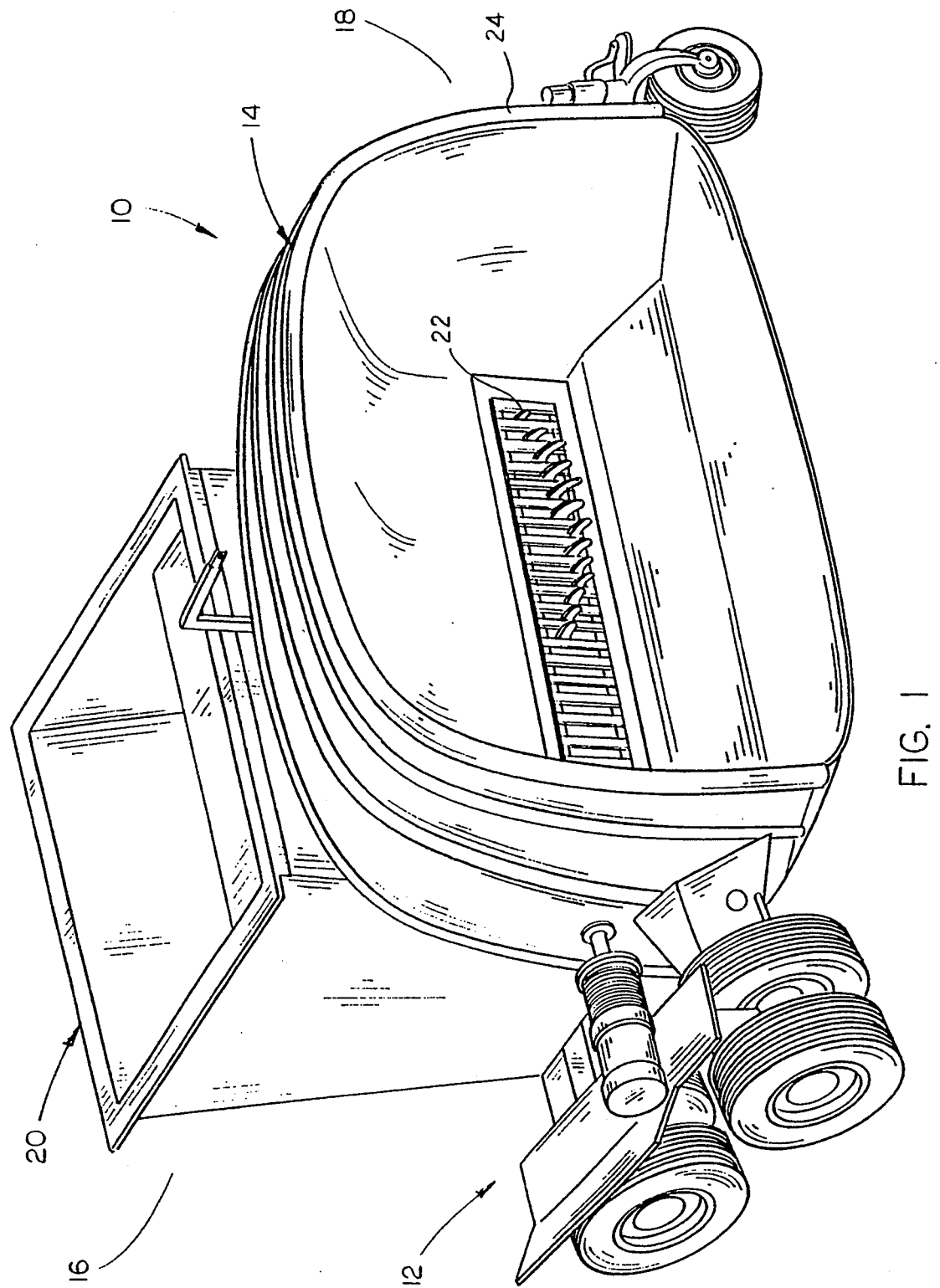
FIG. 1 is a rear perspective view of the bagging machine of this invention.

The numeral 10 refers to an agricultural bagging machine which is substantially conventional in design except for the tunnel grader edge which is located at the rearward end of the tunnel as will be described hereinafter.

Machine 10 includes a wheeled frame means 12 having a tunnel 14 mounted thereon upon which is normally positioned the open mouth of a conventional agricultural bag B. Although the preferred embodiment includes a wheeled frame means, a non-wheeled frame means could be employed. For purposes of conciseness, the power means for driving the various components of the machine have not been disclosed since the same does not form a part of the invention. The power means could be an engine mounted on the machine or a PTO shaft connected to a tractor PTO.

For purposes of description, the bagging machine 10 will be described as including a forward end 16 and a rearward end 18. Bagging machine 10 includes a hopper means 20 at the forward end thereof which is adapted to receive the material to be bagged from a truck, wagon, etc. A rotatable rotor 22 of conventional design is illustrated and is located at the lower end of the hopper means 20 for forcing the material to be bagged into the tunnel 14 and into the bag B in conventional fashion.

Figure 3:
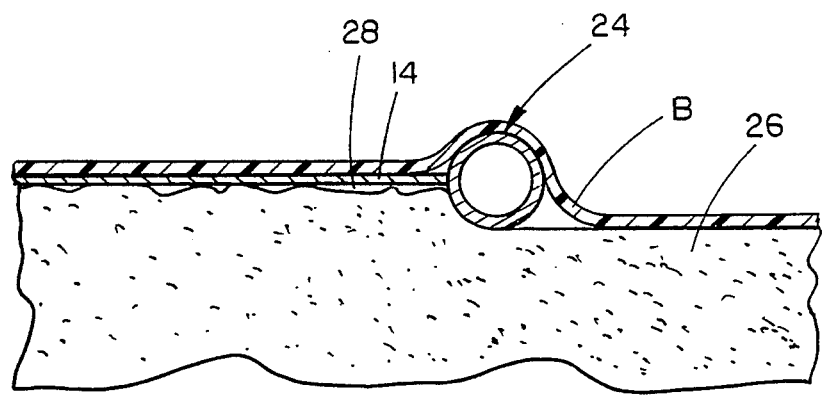
FIG. 3 is an enlarged sectional view seen on lines 3—3 of FIG. 2.

The tunnel grader edge or material engagement means of this invention is referred generally by the reference numeral 24. The tunnel grader edge 24 is preferably in the form of an elongated arcuate tube or pipe having a circular cross-section such as illustrated in FIG. 3. Tunnel grader edge 24 is secured to the rearward end of the tunnel 14 by welding or the like as seen in FIG. 3 so that approximately one-half of the grader edge is inside the tunnel and one-half of the tunnel grader edge 24 is located outside the tunnel 14. For purposes of description, the feedstuff being packed or forced into bag B is referred to generally by the reference numeral 26.

Figure 2:
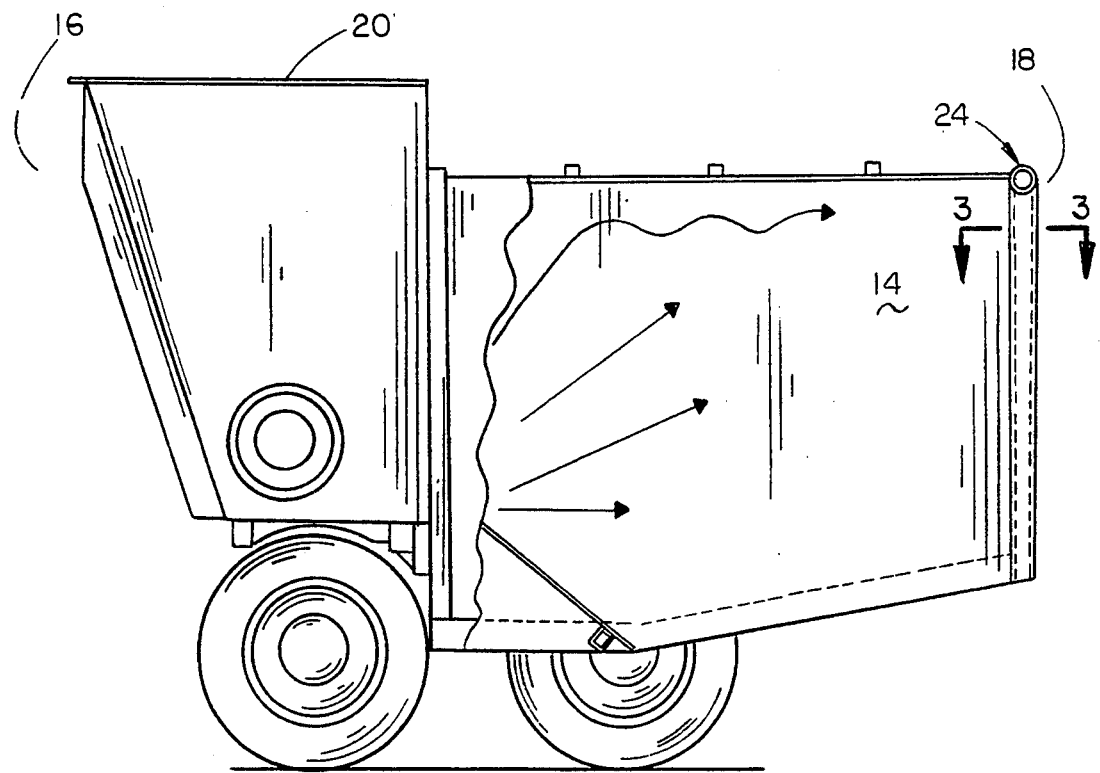
FIG. 2 is a side view of the bagging machine of this invention with a portion of the tunnel cut away to more fully illustrate the invention.

In operation, the rotor 22 forces the silage material or the like contained within the hopper 20 into the tunnel 14 as illustrated by the arrows in FIG. 2. The feedstuff 26 slides along the inside surface of the tunnel 14 as illustrated in FIG. 3 and contacts the grader edge or lip 24 as also illustrated in FIG. 3. The grader edge 24 creates a certain amount of drag on the feed and holds just enough feed back to allow the feed to fill in the hollow void sections which are referred to generally by the reference numeral 28 in FIG. 3 so that the feed will be closely positioned adjacent the bag B so that a smooth filled bag is achieved as is illustrated in FIG. 3.

Thus it can be seen that the invention accomplishes at least all of its stated objectives.

I claim:

1. An agricultural feed bagging machine for bagging agricultural material into agricultural bags having a closed end and an open mouth comprising:

a frame having rearward and forward ends;

a tunnel on said frame and having an intake end for receiving the material to be bagged and an output end adapted to receive the open mouth of the agricultural bag;

said tunnel having a top wall and opposite side walls;

a hopper means on said frame means forwardly of said tunnel for receiving the material to be bagged;

means at the intake end of said tunnel for forcing the material to be bagged from said hopper means into said tunnel and into said bag;

and material engagement means at the output end of said tunnel which protrudes into said tunnel for engagement with the material sliding along the inside surfaces of said side walls and said top wall so that the filled agricultural bag will have a substantially smooth outer surface;

said material engagement means at the output end of said tunnel comprising an elongated tubular member which at least partially protrudes into said tunnel.

2. The machine of claim 1 wherein approximately one-half of the cross-section of said tubular member protrudes into said tunnel.

3. The machine of claim 1 wherein said output end of said tunnel is defined by rear ends of said side walls and said top wall and wherein said tubular member is mounted on the rear ends of said side walls and said top wall.

4. An agricultural feed bagging machine for bagging agricultural material into agricultural bags having a closed end and an open mouth comprising:

a frame having rearward and forward ends;

a tunnel on said frame and having an intake end for receiving the material to be bagged and an output end adapted to receive the open mouth of the agricultural bag;

said tunnel having a top wall and opposite side walls;

a hopper means on said frame means forwardly of said tunnel for receiving the material to be bagged;

means at the intake end of said tunnel for forcing the material to be bagged from said hopper means into said tunnel and into said bag;

and material engagement means at the output end of said tunnel which protrudes into said tunnel for engagement with the material sliding along the inside surfaces of said side walls and said top wall so that the filled agricultural bag will have a substantially smooth outer surface;

said material engagement means at the output end of said tunnel comprising an elongated tubular member which at least partially protrudes into said tunnel;

said output end of said tunnel being defined by rear ends of said side walls and said top wall;

said material engagement means being positioned on the rear ends of said side walls and said top wall;

said material engagement means comprising an elongated arcuate member positioned on the inside surface of said tunnel at the output end thereof.

* * * * *